UNITED STATES PATENT OFFICE 2,515,559

ARC WELDING IN INERT ATMOSPHERES

John Frederick Lancaster and William King Bates Marshall, London, England, assignors to A. P. V. Company Limited, London, England No Drawing. Application September 13, 1948, Serial No. 49,117. In Great Britain September 22, 1947

1 Claim. (Cl. 219—8)

This invention relates to arc welding of metals in inert atmospheres, such processes being commonly known as "heliarc" or "argonarc" welding. In such processes the arc is struck between an electrode (generally a tungsten electrode) and the workpiece in a shroud of inert gas such as argon or helium. In welding certain metals by this process it is customary to use direct current with a pointed tungsten electrode operating as the cathode. It is found that the arc may initially emanate from the end of the electrode but almost invariably tends to wander off the end on to the adjacent conical surface of the electrode and may move around and up and down the electrode. This unstable position or wandering of the arc delays the starting of a weld after striking the arc and militates against consistent welding resulting in uneven welding and tendency to burn holes in thin sheets. The arc is generally stabilised when the tungsten or the cathode spot on the tungsten reaches a certain high temperature. Thus, in striking the arc, conditions are unstable until the tungsten has achieved this temperature, and moreover, this high temperature is maintained during welding. Further, instability of the arc occurs when the tungsten electrode becomes contaminated with the material being welded, and this contamination is more likely to occur with increasing electrode temperature. A contaminated electrode must be reground before welding is resumed.

According to the present invention the arc is made more stable by using an electrode of higher thermionic emissivity than pure tungsten. This increase in thermionic emissivity may be achieved, for instance, by mixing with the tungsten or applying to its surface certain materials as stated below. By this means a stable arc forms at a lower electrode temperature, whereby the arc becomes stable at the point of the electrode immediately on striking the arc, and arc wander during welding is considerably reduced.

The invention also enables the electrode normally to operate at a lower temperature so that the risk of contamination by the metal being welded is reduced, and thus the possibility of arc wander due to this cause avoided.

The tungsten electrode may be artificially chilled by suitable means, e. g. water cooling, whilst still obtaining a stable arc, with even less rapid deterioration of the electrode.

In addition to improving welding consistency and assisting in maintaining welding continuity the above mentioned effects also reduce the consumption of tungsten in that the necessity for frequent re-sharpening and removal of contamination is considerably reduced.

This type of electrode can be used for welding with direct current and may also be used with advantage in certain cases of welding with alternating current. Increasing the thermionic emissivity of the tungsten lowers the voltage required for re-ignition of the arc at the beginning of the half-cycle when the electrode is of negative polarity. This, for example, makes it possible to maintain an alternating current arc using a source of supply giving a relatively low open circuit voltage.

A suitable material for mixing with the tungsten, or for coating the electrode, is thoria, but the oxides of certain other metals more electropositive than tungsten (e. g. barium and strontium) can be used more particularly for the coating. About 0.1 to 3 per cent of thoria in a finely divided state may be dispersed in the tungsten during its production, e. g. by mixing tungsten and thoria and sintering and swaging to the required shape.

Coating of the electrode with the oxide may be effected by heating the electrode—e. g. by striking the arc and making a short weld run on a piece of scrap metal—and then dipping it into a powder consisting of, for example, barium hydroxide or barium nitrate, which decomposes forming a layer of barium oxide on the electrode surface.

We claim:

A tungsten electrode for a welding torch having mixed therein from 0.1 to 3 per cent of finely divided thoria.

JOHN FREDERICK LANCASTER.
WILLIAM KING BATES MARSHALL.

REFERENCES CITED

The following references are of record in the file of this patent:

UNITED STATES PATENTS

| Number | Name | Date |
|---|---|---|
| 1,294,250 | Elliott | Feb. 11, 1919 |
| 1,977,278 | Judy | Oct. 16, 1934 |
| 2,473,600 | Lobosco | June 21, 1949 |
| 2,473,601 | Lobosco | June 21, 1949 |